United States Patent [19]
Iida

[11] 3,804,208
[45] Apr. 16, 1974

[54] CAGE APPARATUS RISING AND FALLING ON A WALL SURFACE

[75] Inventor: Mizuho Iida, Yokohama, Japan

[73] Assignee: Sanwa Tetsuki Kougiyou Kabushiki Kaisha, Tokyo, Japan

[22] Filed: Oct. 5, 1971

[21] Appl. No.: 186,718

[30] Foreign Application Priority Data
Feb. 10, 1971  Japan.................................. 46-5297

[52] U.S. Cl. ................................................. 187/19
[51] Int. Cl. ........................................... B66b 11/04
[58] Field of Search ............................... 187/19, 95

[56] References Cited
UNITED STATES PATENTS
3,016,989  1/1962  Lindmark ........................... 187/19
1,634,854  7/1927  Scollard .............................. 187/19

*Primary Examiner*—Harvey C. Hornsby
*Attorney, Agent, or Firm*—Holman & Stern

[57] ABSTRACT

A cage or car for ascending and descending movements on a vertical wall surface of a structure in which a pin rack and a guide rail on each side of the rack are fixed on the wall surface. The cage is defined by a frame having a bottom plate and arms projecting from the frame are operably engaged with the guide rails. A rotatable driven shaft is supported in the cage in parallelism to the pins of the rack and a sprocket on the driven shaft engages the pins. An internal combustion engine on the bottom surface of the cage and a power transmitting means is provided for driving the driven shaft normally and reversely via a worm-type reduction gear from the engine.

2 Claims, 4 Drawing Figures

PATENTED APR 16 1974 3,804,208

INVENTOR
Mizuho Iida
BY
Holman / Stern

CAGE APPARATUS RISING AND FALLING ON A WALL SURFACE

BACKGROUND OF THE INVENTION

This invention relates to a cage apparatus to be used to ascend and descend on a wall surface of an iron tower or any other structure so that an operator may ride the cage and may freely operate the cage from within to ascend, descend and stop.

An embodiment of the present invention shall be explained with reference to the drawings in which:

BRIEF DESCRIPTION OF THE DRAWINGS

FIG. (1) is a plan view of the present apparatus.

DETAILED DESCRIPTION OF THE INVENTION

Figure 1:
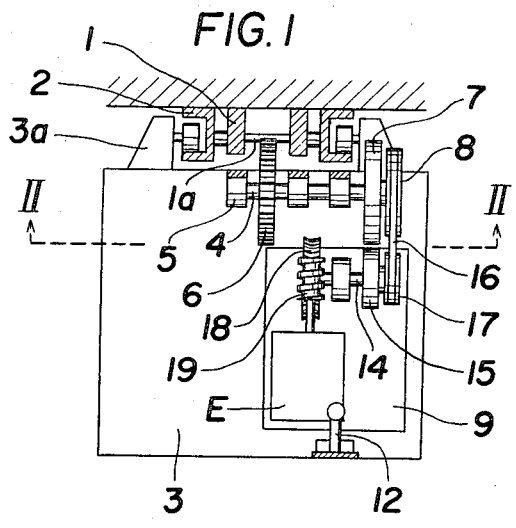
Figure 2:
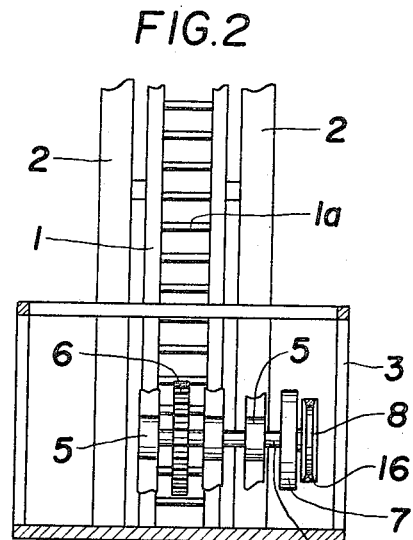
FIG. 2 is a view taken along line II — II in FIG. (1) as seen in the direction indicated by the arrows, FIG. (3) is a side view of the same
Figure 3:
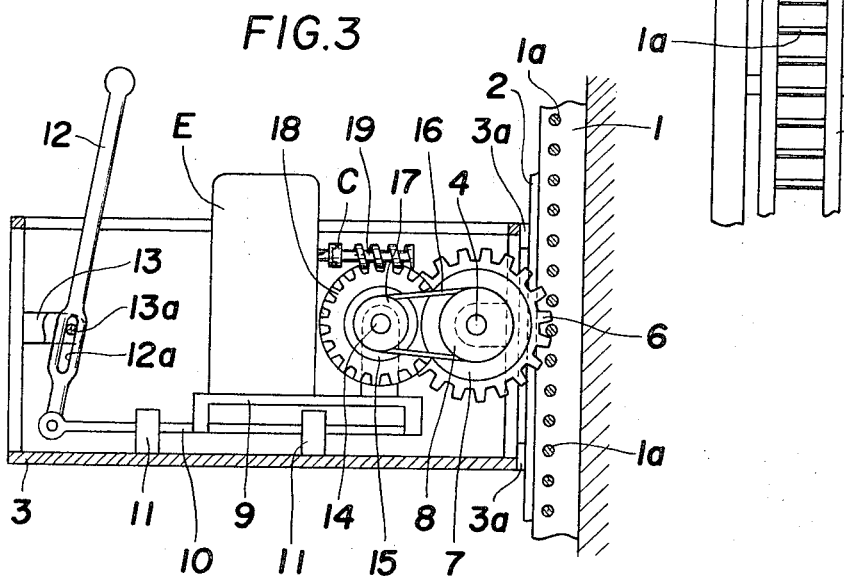
Figure 4:
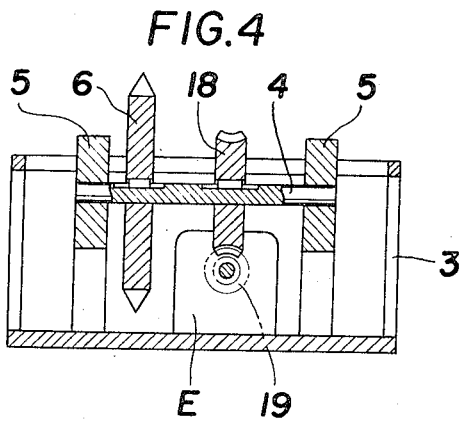
FIG. 4 is a view partly in elevation and partly in section of a cage of another embodiment.

A pin rack (1) and guide rails (2) are fixed respectively on a vertical wall surface of a structure. The pin rack (1) is fitted with horizontal pins (1a) at regular intervals. A cage (3) consists of a frame having a bottom plate, and is provided with arms (3a) projecting out of the side of the frame and engaging with the above mentioned respective guide rails and can ascend and descend along the guide rails. A driven shaft (4) is borne by bearings (5) provided in the cage in parallelism with the pins (1a) of the pin rack and is rotatable therein. To the driven shaft (4) are fixed a sprocket (6), a friction wheel (7) and a pulley (8) which is of lesser diameter than the diameter of the friction wheel (7). A sliding plate (9) can be advanced and retreated in a direction at right angles with the driven shaft on the floor surface of the cage by means of an operating device to be described. An advancing and retreating rod (10) is fixed to the lower surface of the sliding plate (9) and is mounted for free movement in a direction at right angles with the driven shaft by means of bearings (11) fixed to the bottom plate of the cage. Further, a rocking lever (12) is rotatably pivoted at one end to an end part of the rod (10). An axial slot (12a) in the lower part of the rocking lever (12) slidably engages a pin (13a) fixed to the side of the cage through a metallic fixture (13). Hence, by rocking the rocking lever (12), the sliding plate (9) can be moved in and out in the above described direction. A driving shaft (14) is rotatably supported on the sliding plate in parallelism with the driven shaft (4). To the driving shaft are fixed a friction wheel (15) engageable with the friction wheel (7) and a pulley (17) engageable with the pulley (8) through a belt (16). The pulley (17) of lesser diameter than the diameter of the friction wheel (15). Therefore, when the sliding plate is advanced, a pair of the friction wheels (7) and (15) will engage with each other but, when it is retreated, they will be disengaged but, instead, a pair of the pulleys (8) and (17) through the belt (16) will engage with each other. A worm wheel (18) is fixed to the driving shaft (14). An internal combustion engine (E) is provided on the sliding plate. A worm (19) rotated by the crank shaft of the engine through a clutch (C) engages with the worm wheel (18). The worm (19) and wheel (18) form a reduction gear so that the rotation of the engine may be reduced and transmitted to the driving shaft (14) but the worm (19) may not be rotated by the rotation of the wheel (18).

When the rocking lever is moved rightward as in FIG. (3), the sliding plate is positioned on the left and the pulleys (8) and (17) engage with each other, if the sprocket (6) is rotated clockwise by the normal rotation of the engine, the cage will ascend due to the engagement of the sprocket with the pins of the pin rack. When a fixed height is reached, the engine is disconnected through the clutch (C). The anticlockwise rotation of the sprocket caused by the gravity of the cage will be prevented by the engagement of the worm with the worm wheel as mentioned above and the cage will stop in that position. In the case of switching to a descent, the rocking lever is moved leftward to engage the pair of the friction wheels (7) and (15) with each other and the engine is connected through the clutch (C). Then the driven shaft will turn anticlockwise due to the descent of the cage by its dead weight but the rotation the driving shaft will not change from that at the time of the ascent. Therefore, the driven shaft forced to rotate anticlockwise by the downward motion will apply an engine brake to the engine also continuing the normal rotation and therefore the cage will descend at a low speed.

In another embodiment shown in FIG. (4), the sprocket (6) and worm wheel (18) are secured to the driven shaft (4) supported in the bearings (5). A reversing gear (not illustrated) which can switch the rotation of the worm (19) to be normal and reverse is attached to the engine (E) provided on the bottom plate of the cage (3). This worm (19) is engaged with the wheel (18). It is clear that, in this embodiment, the driving shaft (14) and sliding plate (9) in the above mentioned embodiment are unnecessary but the same operation and effect are obtained.

As in the above, according to the present invention, with only the operations of the rocking lever (or the reversing gear in the second embodiment) and the clutch, the ascending, descending and stopping of the cage can be freely controlled. According to the results of experimental manufacture, the cage of a dead weight of about 60kg. operates smoothly with one operator riding therein. As this much weight will do, it is easy to carry the cage. If a structure is always provided with a pin rack and guide rails in advance, it will be possible to fit the cage only when it is required.

What is claimed is:

1. A cage or car apparatus for ascending and descending movements on a vertical wall surface of a structure, comprising a rack having spaced apart horizontal pins, said rack being fixed to the vertical wall surface, a guide rail on each side of and extending longitudinally of the rack, said guide rails being fixed to the vertical wall surface, a cage having a frame provided with a bottom plate and arms projecting from the frame, the arms being operably engaged with the guide rails to allow the cage to ascend and descend along the guide rails, a driven shaft rotatably supported by the cage frame in parallelism to the pins of the rack, a sprocket fixed on the driven shaft and engaging with the pins of the rack, said bottom plate being adjustably mounted in the frame for movement toward and away from the driven shaft, an internal combustion engine mounted to the bottom plate, a driving shaft rotatably supported by the plate in parallelism to the driven shaft, a friction wheel on the driven shaft, a friction wheel on the driving shaft opposite the friction wheel on the driven shaft a pulley carried by each of said shafts and, a belt trained about said pulleys, the pulley on the driven shaft being of lesser diameter than that of the friction wheel thereon, the pulley on the driving shaft being of lesser diameter than that of the friction wheel thereon, a worm wheel on the driving shaft, said engine having a crank shaft provided with a worm for engagement with the worm wheel, with the worm and worm wheel constituting a reduction gear, a clutch for coupling the worm with the crank shaft, and means on the cage operably related to the plate to move the plate so that upon movement of the plate towards the driven shaft, the friction wheels engage and the belt between the pulleys is slackened and the engine is connected via the clutch to the worm and the driven shaft rotated via the worm wheel, driving shaft, and friction wheels to control the lowering of the cage while on movement away from the driven shaft, the friction wheels disengage and the belt is tightened between the pulleys thereby rotating the driven shaft to elevate said cage.

2. The cage or car apparatus as claimed in claim 1 in which said plate moving means includes a lever pivotally movable about a horizontal axis, said lever having an elongated slot adjacent its pivot, a pin on the frame slidably engaging the elongated slot, a rod pivoted at one end to the lever and said rod being fixed to the plate.

* * * * *